United States Patent
Jin

(10) Patent No.: US 9,420,180 B2
(45) Date of Patent: Aug. 16, 2016

(54) METHOD AND DEVICE FOR SWITCHING BETWEEN DOUBLE CAMERAS

(75) Inventor: Chongting Jin, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/402,148

(22) PCT Filed: Jul. 26, 2012

(86) PCT No.: PCT/CN2012/079211
§ 371 (c)(1),
(2), (4) Date: Nov. 19, 2014

(87) PCT Pub. No.: WO2013/174076
PCT Pub. Date: Nov. 28, 2013

(65) Prior Publication Data
US 2015/0319364 A1    Nov. 5, 2015

(30) Foreign Application Priority Data
May 22, 2012 (CN) .......................... 2012 1 0159263

(51) Int. Cl.
*H04N 5/225* (2006.01)
*H04N 5/232* (2006.01)
(Continued)

(52) U.S. Cl.
CPC ............ *H04N 5/23245* (2013.01); *G06F 3/048* (2013.01); *G06F 3/04817* (2013.01); *H04N 5/2258* (2013.01); *H04N 5/23293* (2013.01);
(Continued)

(58) Field of Classification Search
CPC ................................................ H04N 5/23245
USPC .......................................... 348/333.01, 220.1
See application file for complete search history.

(56) References Cited

U.S. PATENT DOCUMENTS 7,940,321 B2 * 5/2011 Sudo .................... H04N 1/0035
348/333.01
8,111,247 B2  2/2012 Thorn
(Continued)

FOREIGN PATENT DOCUMENTS

CN    101291379 A    10/2008
CN    101547333 A    9/2009
CN    102365613 A    2/2012

OTHER PUBLICATIONS

International Search Report in international application No. PCT/CN2012/079211, mailed on Feb. 14, 2013.
(Continued)

*Primary Examiner* — Joel Fosselman
(74) *Attorney, Agent, or Firm* — Oppedahl Patent Law Firm LLC

(57) ABSTRACT

Disclosed are a method and device for switching between double cameras, which belong to the technical field of electronic equipment. The method includes displaying an application icon corresponding to different shooting modes according to a preset operation mode, and detecting a gesture of a user corresponding to the application icon, and starting up a corresponding shooting mode according to the operation of the user. Different operation modes are provided to present an application icon capable of differentiating different shooting modes to a user and corresponding camcorder mode can be directly and rapidly started according to the application icon. Accordingly, fast switching between the cameras on a terminal equipped with double cameras is realized, and the efficiency is improved.

18 Claims, 4 Drawing Sheets

(51) Int. Cl.
*G06F 3/048* (2013.01)
*G06F 3/0481* (2013.01)
*H04N 101/00* (2006.01)

(52) U.S. Cl.
CPC .. *G06F 2203/04808* (2013.01); *H04N 2101/00* (2013.01)

(56) References Cited

U.S. PATENT DOCUMENTS

2004/0027467 A1* 2/2004 Shiga ................... H04N 5/2252 348/231.99

2010/0245287 A1 9/2010 Thorn

OTHER PUBLICATIONS

English Translation of the Written Opinion of the International Search Authority in international application No. PCT/CN2012/079211, mailed on Feb. 14, 2013.

Supplementary European Search Report in European application No. 12877583.0, mailed on Mar. 5, 2015.

Android 2.3.4 User's Guide, May 20, 2011.

PDA Phone User Manua, Sep. 30, 2007.

* cited by examiner

METHOD AND DEVICE FOR SWITCHING BETWEEN DOUBLE CAMERAS

TECHNICAL FIELD

The disclosure relates to the technical field of electronic equipment, and in particular to a method and device for switching between double cameras.

BACKGROUND

At present, there are more and more terminals with double cameras. Cameras in use are often applied to take a picture or video, and the switch between double cameras and the switch between a photo mode and a camcorder mode are performed frequently. But presently the switching operation between cameras is complicated which results in inconvenience for a user to switch between cameras. Therefore, how to design to make the switch rapid for users is significantly important for the improvement of work efficiency and user experience.

SUMMARY

A main purpose of the embodiment of the disclosure is to provide a method and device for switching between double cameras, so as to perform a rapid switch between shooting modes via one application icon in a terminal equipped with double cameras.

In order to achieve the above aim, the embodiment of the disclosure provides a method for switching between double cameras, which includes:

displaying one application icon corresponding to different shooting modes according to a preset operation mode; and detecting a hand gesture of a user operated on the application icon, and starting a corresponding shooting mode according to the operation of the user.

Before displaying the application icon corresponding to different shooting modes according to the preset operation mode, the method further may include:

presetting the application icon corresponding to different shooting modes.

After detecting the hand gesture of the user operated on the application icon and starting the corresponding shooting mode according to the operation of the user, the method further may include:

recording the corresponding shooting mode when exiting from an application occurs and updating the application icon for displaying the application icon to the user at the next start-up.

The operation mode may include two shooting modes, and the step of detecting the hand gesture of the user operated on the application icon and starting the corresponding shooting mode according to the operation of the user may include:

starting the corresponding shooting mode when detecting that the application icon is clicked/shortly pressed, and starting another shooting mode of the operation mode when detecting that the application icon is double-clicked/long-pressed.

The operation mode may include a front-facing camera mode and a rear-facing camera mode, or includes a photo mode and a camcorder mode.

The embodiment of the disclosure also provides a device for switching between double cameras, which includes:

a display module configured to display an application icon corresponding to different shooting modes according to an operation mode which has been preset; and a mode-starting module configured to detect a hand gesture of a user operated on the application icon and start a corresponding shooting mode according to the operation of the user.

The device further may include a preset module configured to preset the application icon corresponding to different shooting modes.

The device further may include an update module configured to record the corresponding shooting mode when exiting from an application occurs and updating the application icon for displaying the application icon to the user at the next start-up.

The operation mode may include two shooting modes, and the mode-starting module may be configured to start the corresponding shooting mode when detecting that the application icon is clicked/shortly pressed, and start another shooting mode in the operation mode when detecting that the application icon is double-clicked/long-pressed.

The operation mode may include a front-facing camera mode and a rear-facing camera mode, or include a photo mode and a camcorder mode.

In the method and device provided by the embodiment of the disclosure, different operation modes are provided for present an application icon capable of differentiating different shooting modes to the user, and the corresponding shooting mode may be directly and rapidly started according to the application icon, thus realizing rapid switching between the cameras in a terminal equipped with double cameras and improving the efficiency.

DETAILED DESCRIPTION

In order to make the purposes, technical solutions and advantages of the disclosure more clear, the disclosure is further illustrated in detail hereinafter in conjunction with accompanying drawings and embodiments. It should be understood that the embodiments described herein are only intended to illustrate the disclosure but not to limit the disclosure.

The embodiment of the disclosure relates to a terminal in which a double-camera hardware is included and in which both an operating system and a camera drive can normally work. Specifically, the terminal may be a smart phone, a tablet PC and may be other audiovisual equipment meeting with the requirements.

Figure 1:
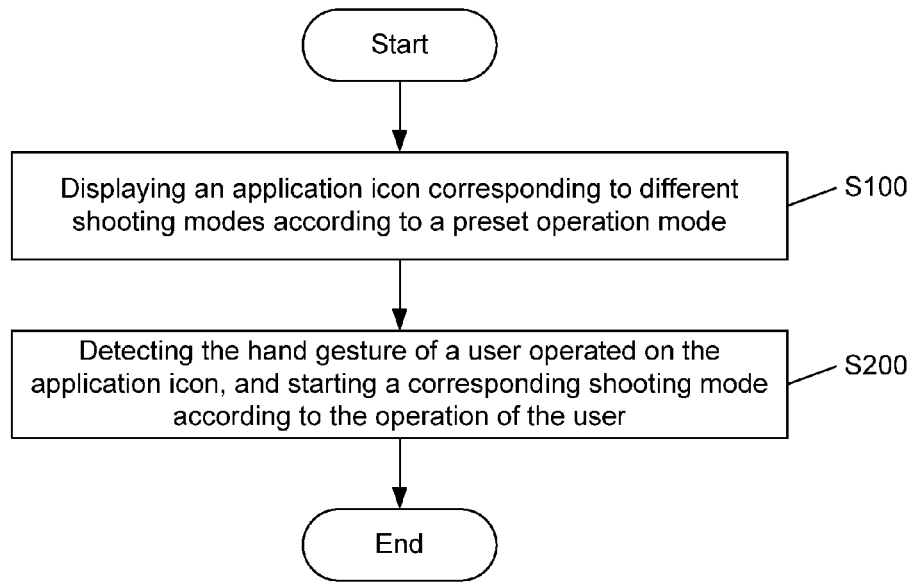
FIG. 1 is a flowchart of a method for switching between double cameras according to an embodiment of the disclosure.

FIG. 1 is a flowchart of a method for switching between double cameras according to an embodiment of the disclosure. As shown in FIG. 1, the following steps are included in the method.

S100: An application icon corresponding to different shooting modes is displayed according to a preset operation mode.

An operation mode may include several shooting modes for switching, and different shooting modes in a corresponding operation mode may correspond to different application icons. After a camera function is called by a user by entering a menu interface or through a third-party software, different application icons are displayed by the terminal to the user according to different shooting modes in the preset operation mode. The operation mode may include several shooting modes for switching. For different shooting modes, application icons of different patterns may be displayed by the terminal for facilitating the user to find corresponding shooting modes according to the displayed application icons and perform a further operation out of the need of the user. The shooting mode refers to the working state of a camera of the terminal. For example, the operation mode in the present embodiment may include a front-facing camera mode and a rear-facing camera mode so as to achieve the switch between the front/rear-facing cameras; another operation mode in other embodiments may further include a photo mode and a camcorder mode to achieve the switch between photo/camcorder functions.

S200: A hand gesture of a user operated on the application icon is detected, and a corresponding shooting mode is started according to the operation of the user.

After a shooting mode corresponding to one application icon is found, the user performs corresponding hand gesture on the application icon according to his/her own need. Since one operation mode may include several shooting modes, a shooting mode corresponding to the application icon or other shooting modes in the operation mode are started according to different hand gestures of the user after the user's hand gestures are detected by the terminal so that the user can perform different operation on the same application icon and thus may switch between different shooting modes. The user may click one application icon to enter a shooting mode corresponding to the application icon and click twice the application icon to enter another shooting mode in the operation mode, or may adopt different combinations of hand gestures, such as short clicking/long-pressing of the application icon and the like.

Figure 2:
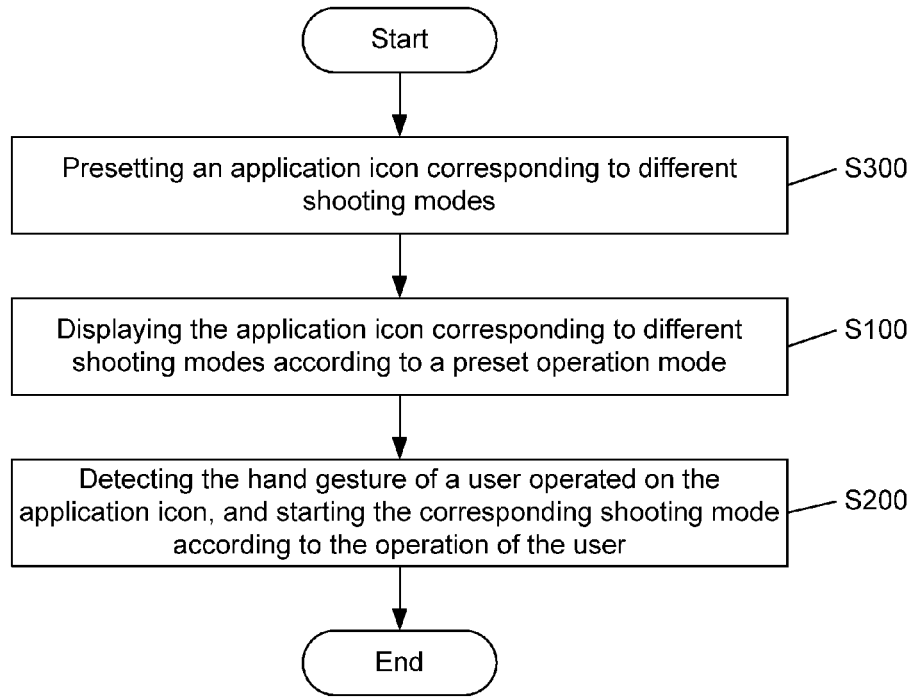
FIG. 2 is a flowchart of a method for switching between double cameras according to another embodiment of the disclosure.

FIG. 2 is a flowchart of a method for switching between double cameras according to another embodiment of the disclosure. As shown in FIG. 2, before the step S100, the method further includes that:

S300: An application icon corresponding to different shooting modes may be preset.

Corresponding to different shooting modes, an application icon may be preset in the memory of the terminal. The application icon may be found in any user interfaces containing a camera application, including a standby camera icon, a frequency-locking camera icon, a main program menu camera icon and other interface icon which calls the application of the camera application interface. For example, according to different shooting modes, the terminal may include but not limited to the application icons of different types in the following table, which are preset in the memory of the terminal:

| Number | Type of application icon | Current operation mode | Current shooting mode |
|---|---|---|---|
| 1 | Front-facing camera icon | Operation mode including front/rear-facing camera mode | Front-facing camera, available when click |
| 2 | Rear-facing camera icon | Operation mode including front/rear-facing camera mode | Rear-facing camera, available when click |
| 3 | Photo icon | Operation mode including photo/camcorder mode | Photo mode, available when click |
| 4 | Camcorder icon | Operation mode including photo/camcorder mode | Camcorder mode, available when click |

Figure 3:
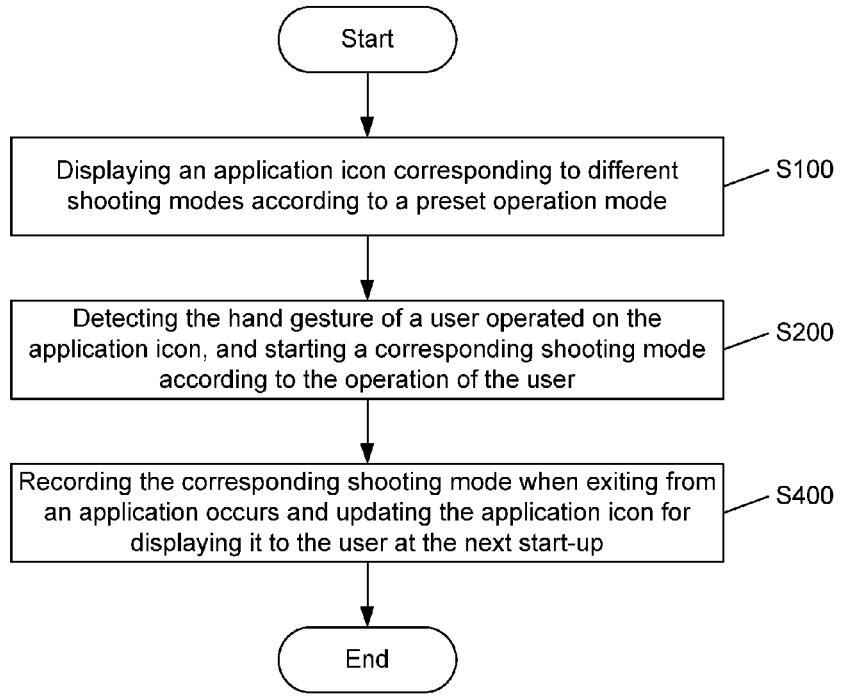
FIG. 3 is a flowchart of a method for switching between double cameras according to yet another embodiment of the disclosure.

FIG. 3 is a flowchart of a method for switching between double cameras according to yet another embodiment of the disclosure. As shown in FIG. 3, after the step S200, the method further includes that:

S400: the shooting mode is recorded when exiting from an application occurs and a corresponding application icon is updated to be displayed to the user at the next start-up.

When the terminal exits from an application, the terminal may record the shooting mode used when the terminal exits from the application, and saves the shooting mode as an actual application icon of the camera to replace the original application icon of the camera and updates it in the application package of the camera. At the next start-up, the updated application icon may be displayed. For example, after the user starts a shooting mode which is in a front-facing camera state, the user records this state and updates the application icon of the camera into one application icon corresponding to the front-facing camera state to record the habit of the user. When a camera application is called by the user by entering a menu interface or through a third-party software, the application icon corresponding to the front-facing camera state is displayed to the user and a corresponding shooting mode is applied according to the operation of the user.

More specifically, the operation mode may include two shooting modes: one is setting a hand gesture of a user to operate one application icon to enter a corresponding shooting mode, another is setting another hand gesture to operate the application icon to enter another shooting mode. The hand gesture includes but is not limited to click, double-click, short-press, long-press and slide. The step S200 specifically includes:

starting the corresponding shooting mode when detecting that one application icon is clicked/shortly pressed, and starting another shooting mode in the operation mode when detecting that the application icon is double-clicked/long-pressed.

Figure 4:
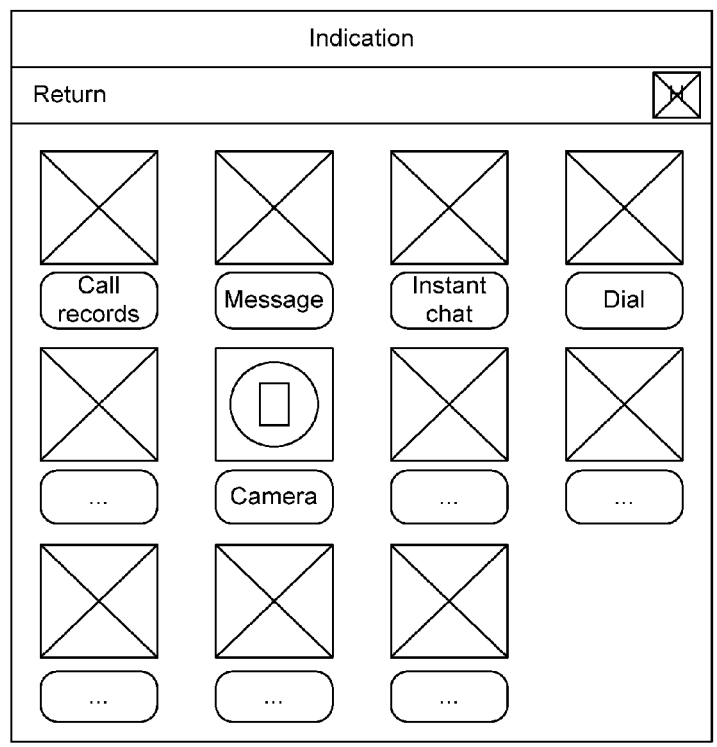
FIG. 4 is a schematic diagram of a menu interface when an application icon corresponds to a front-facing camera mode according to an embodiment of the disclosure.

More specifically, in the present embodiment, the operation mode may include a front-facing camera mode and a rear-facing camera mode. When a shooting mode corresponding to one application icon is the front-facing camera mode, as shown in FIG. 4 which is a schematic diagram of a menu interface when an application icon corresponds to a front-facing camera mode according to the present embodiment, the photo (camera) mode with front-facing camera is started when the application icon is detected to be clicked, and the photo (camera) mode with rear-facing camera is started when the application icon is detected to be clicked twice. The application icon information in the application package of the camera may be updated for the above mentioned photo or camcorder mode according to the shooting mode saved when the application of the camera exited last time. For example, if the saved shooting mode at the last start-up is the photo mode with front-facing camera, the photo mode with front-facing camera is started when the application icon is clicked, and the photo mode with rear-facing camera is started when the application icon is double clicked. A default photo or camcorder mode may be preset in the terminal or set according to the setting received from users. When a photo mode is set to be a default mode, the photo mode is started by default when the application icon is clicked no matter which shooting mode is saved in the terminal.

Figure 5:
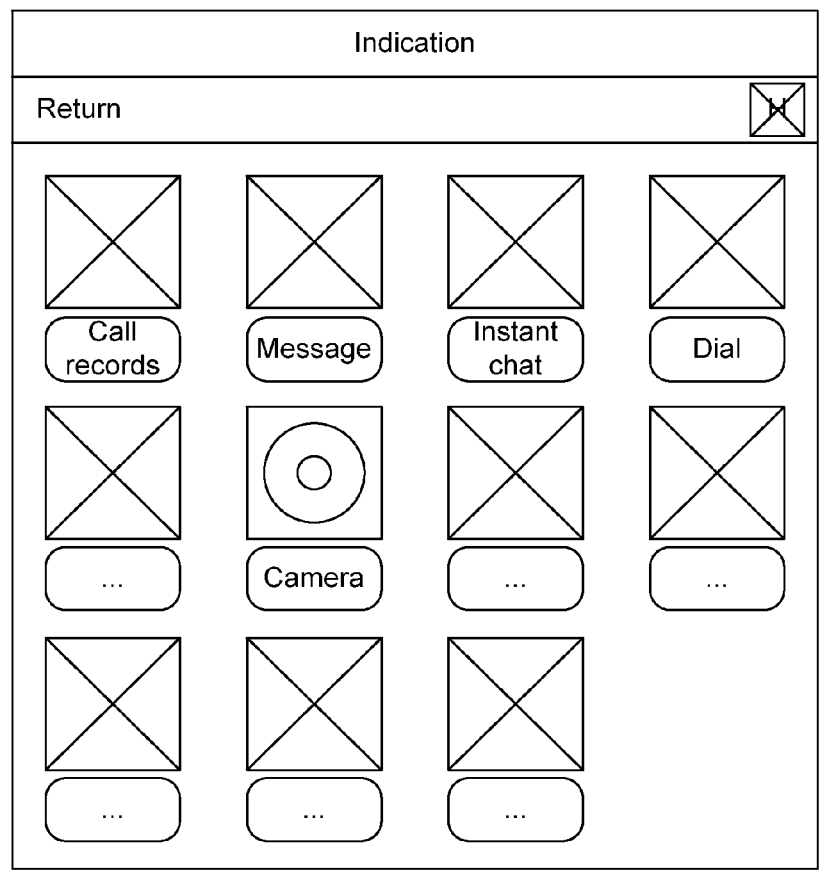
FIG. 5 is a schematic diagram of a menu interface when an application icon corresponds to a photo mode according to an embodiment of the disclosure.

In other embodiments, the operation mode may also include a photo mode and a camcorder mode. When the shooting mode corresponding to the application icon is a photo mode, as shown in FIG. 5 which is a schematic diagram of a menu interface when an application icon corresponds to a photo mode according to the present embodiment, the photo mode with front-facing camera (or the rear-facing camera) is started when the application icon is detected to be clicked, and the camcorder mode with front-facing camera (or the rear-facing camera) is started when the application icon is detected to be double clicked. The application icon information in the application package of the camera may be updated for the above mentioned front-facing camera mode or the rear-facing camera mode according to the shooting mode saved when the application of the camera exited last time, and a default front-facing camera mode or rear-facing camera mode may be preset in the terminal or set based on the setting received from users.

It should be understood that other methods for switching between and starting up shooting modes may also be obtained through the combinations of different hand gestures and different shooting modes and they are not be described herein.

In the method provided by the embodiment of the disclosure, different operation modes are provided for presenting an application icon capable of differentiating different shooting modes to the user and a corresponding shooting mode may be directly and rapidly started according to the application icon, thus realizing rapid switching between cameras in a terminal equipped with double cameras and improving the efficiency.

Figure 6:
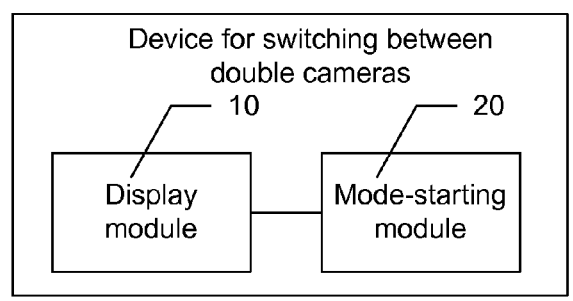
FIG. 6 is a structural diagram of a device for switching between double cameras according to an embodiment of the disclosure.

FIG. 6 is a structural diagram of a device for switching between double cameras according to an embodiment of the disclosure. As shown in FIG. 6, the device includes:
  a display module 10 configured to display an application icon corresponding to different shooting modes according to a preset operation mode;
  a mode-starting module 20 configured to detect a hand gesture of a user operated on the application icon and start a corresponding shooting mode according to the operation of the user.

The operation mode includes several shooting modes for switching and different application icons are displayed corresponding to different shooting modes. After a camera function is called by a user through entering a menu interface or through a third-party software, different application icons are displayed by the display module 10 to the user according to different shooting modes in the preset operation mode. The operation mode may include several shooting modes for switching. For different shooting modes, the display module 10 displays an application icon of different patterns for facilitating a user to enter a corresponding shooting mode through the displayed application icon and perform a further operation according to the need of the user itself. The shooting mode refers to the working state of cameras of the terminal. For example, the operation mode in the present embodiment may include a front-facing camera mode and a rear-facing camera mode so as to achieve the switch between the front/rear-facing cameras; another operation mode in other embodiments may further include a photo mode and a camcorder mode to achieve the switch between photo/camera functions.

After the shooting mode corresponding to the application icon is got, the user performs corresponding hand gesture on the application icon out of its own need. Since the operation mode includes several shooting modes, the shooting mode corresponding to the application icon or other shooting mode in the operation mode is started according to different hand gestures of the user after the user's hand gesture is detected by the mode-starting module 20, the user can perform different operation on the same application icon and thus may switch between different shooting modes. The user may click the application icon to enter the shooting mode corresponding to the application icon and may double-click the application icon to enter another shooting mode of the operation mode, or may further adopt different combinations of hand gestures, such as short clicking/long-pressing of the application icon and the like.

Figure 7:
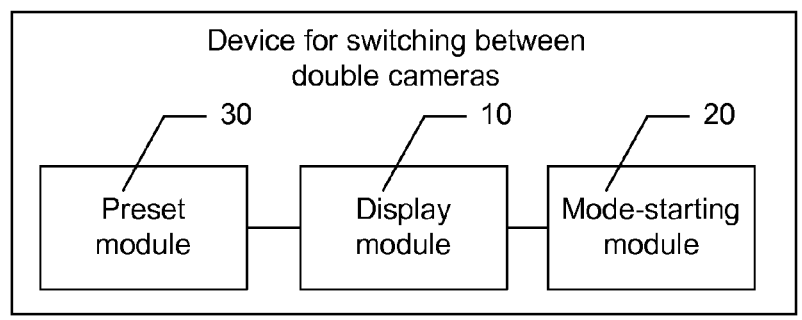
FIG. 7 is a structural diagram of a device for switching between double cameras according to another embodiment of the disclosure.

Based on the above embodiment, please refer to FIG. 7 which is a structural diagram of a device for switching between double cameras according to another embodiment of the disclosure. As shown in FIG. 7, the device may further include:
  a preset module 30 configured to preset an application icon corresponding to different shooting modes.

Corresponding to different shooting modes, the application icon is preset by the preset module 30 in the memory of the terminal. The application icon may be found in any user interfaces containing a camera application, including a standby camera icon, a frequency-locking camera icon, a main program menu camera icon and other interface icon which calls the application of camera application interface. For example, according to different shooting modes, the preset module 30 may preset in the memory of the terminal (including but not limited to) the application icons of different types in the following table:

| Number | Type of application icon | Current operation mode | Current shooting mode |
|---|---|---|---|
| 1 | Front-facing camera icon | Operation mode including front/rear-facing camera mode | Front-facing camera, available when click |
| 2 | Rear-facing camera icon | Operation mode including front/rear-facing camera mode | Rear-facing camera, available when click |
| 3 | Photo icon | Operation mode including photo/Camcorder mode | Photo mode, available when click |
| 4 | Camcorder icon | Operation mode including photo/Camcorder mode | Camcorder mode, available when click |

Figure 8:
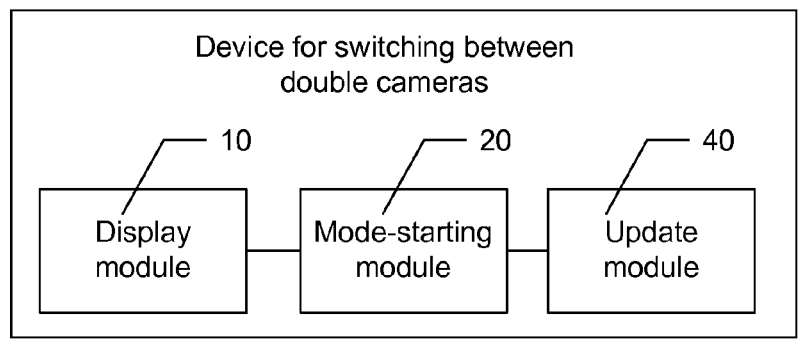
FIG. 8 is a structural diagram of a device for switching between double cameras according to yet another embodiment of the disclosure.

FIG. 8 is a structural diagram of a device for switching between double cameras according to yet another embodiment of the disclosure. As shown in FIG. 3, the device may further include:
  an update module 40 configured to record a shooting mode when exiting from an application occurs and to update a corresponding application icon for displaying it to a user at the next start-up.

When exiting from an application occurs, the update module 40 may record a shooting mode used when exiting from the application occurs, and the shooting mode used when exiting from the application occurs is saved as an actual application icon of the camera to replace the original application icon of the camera and is updated in the application package of the camera. At the next start-up, the display module 10 may display the updated application icon. For example, after the shooting mode started by the user enters the front-facing camera state, the update module 40 records this state and updates the application icon of the camera into an application icon corresponding to the front-facing camera state to record the habit of the user. When the user calls a camera application through entering a menu interface or through a third-party software next time, the display module 10 displays the icon corresponding to the front-facing camera state to the user and the mode-starting module 20 enters a corresponding shooting mode according to the operation of the user.

More specifically, the operation mode may include two shooting modes: one is setting a hand gesture of a user to operate one application icon to enter a corresponding shooting mode, another is setting another hand gesture to operate the application icon to enter another shooting mode, wherein the hand gesture includes but is not limited to click, double-click, short-press, long-press and slide. The mode-starting module 20 is particularly configured to:

start the corresponding shooting mode when detecting that one application icon is clicked/shortly pressed, and start the other shooting mode of the operation mode when detecting that the application icon is double-clicked/long-pressed.

More specifically, in the present embodiment, the operation mode may include a front-facing camera mode and a rear-facing camera mode. When the shooting mode corresponding to the application icon is the front-facing camera mode, as shown in FIG. 5 which is a schematic diagram of a menu interface when an application icon corresponds to a front-facing camera mode according to the present embodiment, the photo (camcorder) mode with front-facing camera is started when the mode-starting module 20 detects that the application icon is clicked, and the photo (camcorder) mode with rear-facing camera is started when the mode-starting module 20 detects that the application icon is double clicked. The application icon information in the application package of the camera may be updated through the above mentioned photo or camcorder mode according to the shooting mode saved when the application of the camera exited last time. For example, if the saved shooting mode at the last start-up is the photo mode with front-facing camera, the photo mode with front-facing camera is started when the application icon is clicked, and the photo mode with rear-facing camera is started when the application icon is double clicked. A default photo or camcorder mode may be preset in the terminal or set according to the setting received from users. When a photo mode is set as a default mode, the photo mode is started by default when the application icon is clicked no matter which shooting mode is saved in the terminal.

In other embodiments, the operation mode may also include a photo mode and a camcorder mode. When the shooting mode corresponding to the application icon is a photo mode, as shown in FIG. 6 which is a schematic diagram of a menu interface when an application icon corresponds to a photo mode according to the present embodiment, the photo mode with front-facing camera (or the rear-facing camera) is started when the application icon is detected to be clicked, and the camcorder mode with front-facing camera (or the rear-facing camera) is started when the application icon is detected to be double clicked. The application icon information in the application package of the camera may be updated according to the shooting mode saved when the application of the camera exited last time, and a default front-facing camera mode or rear-facing camera mode may be preset in the terminal or set based on the setting received from users.

It should be understood that other methods for switching between and starting up shooting modes may also be obtained through the combinations of different hand gestures and different shooting modes and they are not be described herein.

In the method provided by the embodiments of the disclosure, different operation modes are provided for presenting an application icon capable of differentiating different shooting modes to the user, and the corresponding shooting mode may be directly and rapidly started according to the application icon, thus realizing rapid switching between the cameras in a terminal equipped with double cameras and improving the efficiency.

The above embodiments are only preferred embodiments of the disclosure and not used to limit the disclosure. Any modifications, alternatives and improvements made within the spirit and principle of the disclosure should be included in the protection scope of the disclosure.

What is claimed is:

1. A method for switching between double cameras, comprising:

displaying an application icon corresponding to a shooting mode in a menu interface according to an operation mode which has been preset in a memory, wherein the application icon to be displayed changes with the operation mode and the operation mode includes a first shooting mode and a second shooting mode;

detecting a hand gesture of a user operated on the application icon, and starting the first shooting mode or the second shooting mode according to the hand gesture of the user to switch between the first shooting mode and the second shooting mode.

2. The method according to claim 1, further comprising: before displaying the application icon corresponding to the different shooting modes according to the operation mode which has been preset, presetting the application icon corresponding to the different shooting modes.

3. The method according to claim 1, further comprising: after detecting the hand gesture of the user operated on the application icon and starting the corresponding shooting mode according to the operation of the user, recording the corresponding shooting mode when exiting from an application occurs and updating the application icon for displaying the application icon to the user at next start-up.

4. The method according to claim 1, wherein the operation mode comprises two shooting modes, and wherein detecting the hand gesture of the user operated on the application icon and starting the corresponding shooting mode according to the operation of the user comprises:

starting the corresponding shooting mode when detecting that the application icon is clicked/shortly pressed, and starting another shooting mode in the operation mode when detecting that the application icon is double-clicked/long-pressed.

5. The method according to claim 4, wherein the operation mode comprises a front-facing camera mode and a rear-facing camera mode, or comprises a photo mode and a camcorder mode.

6. A device for switching between double cameras, comprising
a processor; and
a memory coupled to the processor which is configured to be capable of executing programmed instructions stored in the memory to:
display an application icon corresponding to a shooting mode in the display according to an operation mode which has been preset in the memory, wherein the application icon to be displayed changes with the operation mode and the operation mode includes a first shooting mode and a second shooting mode; detect a hand gesture of a user operated on the application icon and
start the first shooting mode or the second shooting mode according to the hand gesture of the user to switch between the first shooting mode and the second shooting mode.

7. The device according to claim 6, the memory is configured to preset the application icon corresponding to the different shooting modes.

8. The device according to claim 6, the processor is configured to be capable of executing programmed instructions stored in the memory to further record the corresponding shooting mode when exiting from an application occurs and update the application icon for displaying the application icon to the user at next start-up.

9. The device according to claim 6, wherein the operation mode comprises two shooting modes, and the processor is further configured to be capable of executing programmed instructions stored in the memory to further start the corresponding shooting mode when detecting that the application icon is clicked/shortly pressed, and start another shooting mode in the operation mode when detecting that the application icon is double-clicked/long-pressed.

10. The device according to claim 9, wherein the operation mode comprises a front-facing camera mode and a rear-facing camera mode, or comprises a photo mode and a camcorder mode.

11. The method according to claim 2, wherein the operation mode comprises two shooting modes, and wherein detecting the hand gesture of the user operated on the application icon and starting the corresponding shooting mode according to the operation of the user comprises:
starting the corresponding shooting mode when detecting that the application icon is clicked/shortly pressed, and starting another shooting mode in the operation mode when detecting that the application icon is double-clicked/long-pressed.

12. The method according to claim 3, wherein the operation mode comprises two shooting modes, and wherein detecting the hand gesture of the user operated on the application icon and starting the corresponding shooting mode according to the operation of the user comprises:
starting the corresponding shooting mode when detecting that the application icon is clicked/shortly pressed, and starting another shooting mode in the operation mode when detecting that the application icon is double-clicked/long-pressed.

13. The method according to claim 11, wherein the operation mode comprises a front-facing camera mode and a rear-facing camera mode, or comprises a photo mode and a camcorder mode.

14. The method according to claim 12, wherein the operation mode comprises a front-facing camera mode and a rear-facing camera mode, or comprises a photo mode and a camcorder mode.

15. The device according to claim 7, wherein the operation mode comprises two shooting modes, and the processor is further configured to be capable of executing programmed instructions stored in the memory to further start the corresponding shooting mode when detecting that the application icon is clicked/shortly pressed, and start another shooting mode in the operation mode when detecting that the application icon is double-clicked/long-pressed.

16. The device according to claim 8, wherein the operation mode comprises two shooting modes, and the processor is further configured to be capable of executing programmed instructions stored in the memory to further start the corresponding shooting mode when detecting that the application icon is clicked/shortly pressed, and start another shooting mode in the operation mode when detecting that the application icon is double-clicked/long-pressed.

17. The device according to claim 15, wherein the operation mode comprises a front-facing camera mode and a rear-facing camera mode, or comprises a photo mode and a camcorder mode.

18. The device according to claim 16, wherein the operation mode comprises a front-facing camera mode and a rear-facing camera mode, or comprises a photo mode and a camcorder mode.

* * * * *